(12) United States Patent
Deters et al.

(10) Patent No.: US 10,773,297 B2
(45) Date of Patent: Sep. 15, 2020

(54) METHOD, USING A CARBONYL COMPOUND, FOR PRODUCING MOULDS AND CORES FOR METAL CASTING, AND THE MOULDS AND CORES PRODUCED THEREBY

(71) Applicant: ASK Chemicals GmbH, Hilden (DE)

(72) Inventors: Heinz Deters, Düsseldorf (DE); Hannes Lincke, Cologne (DE); Ronja Resch, Velbert (DE); Oliver Schmidt, Langenfeld (DE)

(73) Assignee: ASK Chemicals GmbH, Hilden (DE)

( * ) Notice: Subject to any disclaimer, the term of this patent is extended or adjusted under 35 U.S.C. 154(b) by 1066 days.

(21) Appl. No.: 15/104,851

(22) PCT Filed: Dec. 19, 2014

(86) PCT No.: PCT/DE2014/000640
§ 371 (c)(1),
(2) Date: Jun. 15, 2016

(87) PCT Pub. No.: WO2015/090269
PCT Pub. Date: Jun. 25, 2015

(65) Prior Publication Data
US 2016/0311012 A1 Oct. 27, 2016

(30) Foreign Application Priority Data
Dec. 19, 2013 (DE) .................. 10 2013 114 581

(51) Int. Cl.
*B22C 1/00* (2006.01)
*B22C 1/16* (2006.01)
*B22C 1/18* (2006.01)
*C03C 10/00* (2006.01)

(52) U.S. Cl.
CPC .............. *B22C 1/162* (2013.01); *B22C 1/00* (2013.01); *B22C 1/188* (2013.01); *C03C 10/0009* (2013.01); *C03C 2204/00* (2013.01)

(58) Field of Classification Search
CPC .. B22C 1/00; B22C 1/16; B22C 1/162; B22C 1/18; B22C 1/188

USPC ............ 164/12, 16, 520, 525, 529; 523/139; 106/38.35
See application file for complete search history.

(56) References Cited

U.S. PATENT DOCUMENTS

| | | | |
|---|---|---|---|
| 3,827,869 A | * | 8/1974 | von Bonin .............. C04B 16/04 65/22 |
| 2015/0129155 A1 | | 5/2015 | Koch |
| 2015/0174644 A1 | | 6/2015 | Deters et al. |

FOREIGN PATENT DOCUMENTS

| | | |
|---|---|---|
| AT | 341125 B | 1/1978 |
| CA | 1191016 A | 7/1985 |
| CN | 1212913 | 4/1999 |
| CN | 101947637 | 1/2011 |
| DE | 3600956 | 7/1987 |

OTHER PUBLICATIONS

Guangming, Jin, "The Research on Core Making Technology in Sodium Silicate Cold Box", Proceedings of the 69th World Foundry Congress, WFC 2010—Hangzhou, China, Oct. 16-20, 2010; Oct. 16, 2010, p. 1000/823; XP009483613; ISBN: 978-1-62276-286-6. Abstract.

* cited by examiner

*Primary Examiner* — Kevin P Kerns
(74) *Attorney, Agent, or Firm* — Standley Law Group LLP; Stephen L. Grant; Jeffrey S. Standley

(57) ABSTRACT

A moulding material mixture with at least one refractory material and water glass as an inorganic binding agent is used for producing casting moulds. The binding agent is cured with the aid of a carbonyl compound that has a molecular weight greater than 88 g/mol and less than 200 g/mol and a boiling point at 1013 hPa greater than 20° C. and less than 200° C. The at least one carbonyl compound is introduced into the gas phase, or carried with the gas phase. The at least one carbonyl compound has the formula $R^1R^2C\!\!=\!\!O$, where $R^1$ is H or a C1 or C2 alkyl and $R^2$ is a carboxyl group R—C(=O)—O— bonded via the oxygen atom, where R is a C1 to C3 hydrocarbon.

37 Claims, 1 Drawing Sheet

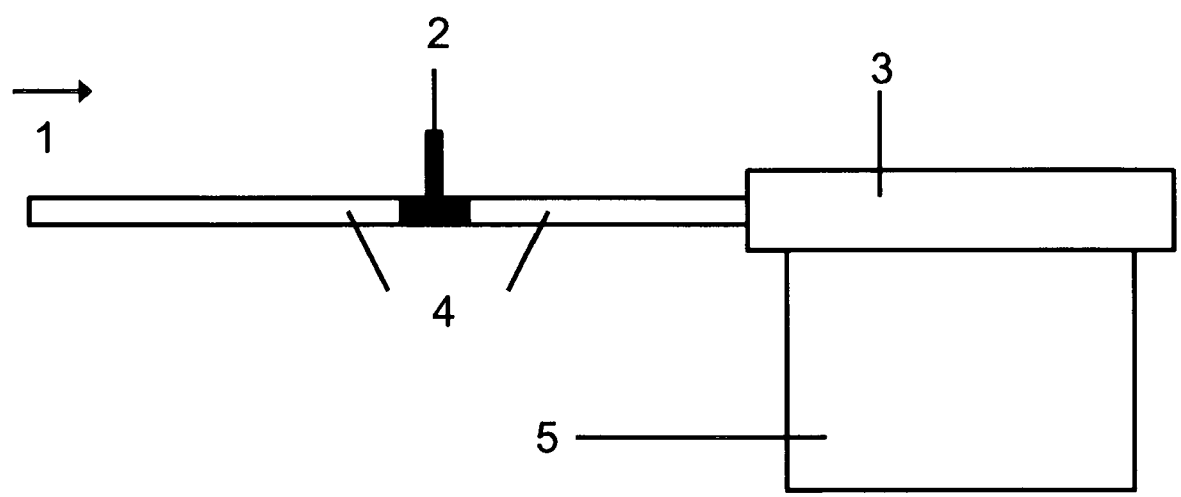

METHOD, USING A CARBONYL COMPOUND, FOR PRODUCING MOULDS AND CORES FOR METAL CASTING, AND THE MOULDS AND CORES PRODUCED THEREBY

The invention relates to a method for producing casting moulds and cores, according to which a moulding material mixture consisting of at least one refractory material and water glass as an inorganic binding agent is cured with the aid of a carbonyl compound introduced into the gas phase, or carried with the gas phase. The invention further relates to a corresponding moulding material mixture, a multi-component system and to the moulds and cores produced according to the method.

STATE OF THE ART

For the production of moulds and cores generally a refractory basic moulding material such as silica sand and a suitable binder are used. The refractory basic moulding material is available preferably in a free flowing mould so that the basic moulding material mixture and binder, so-called moulding material mixture, is poured into a suitable hollow mould where it can be compressed and cured. The binder produces firm cohesion between the particles of the basic moulding material so that the moulds and cores obtain the required mechanical stability.

During casting the outer wall moulds are formed for the casting, cores are inserted if hollow spaces are required within the casting. It is not imperative that moulds and cores comprise the same material. Thus, in permanent mould casting, the external moulding of the castings is done by means of metallic permanent moulds. A combination of moulds and cores that have been produced by various processes is also possible. The following description with regards to cores applies simultaneously to moulds (casting mould) produced by the same process and vice versa.

Both organic and inorganic binders can be used for the production of cores which can be cured by cold or hot processes. Cold processes are essentially carried out at room temperature (25° C.) without heating the moulding tool used for the core production.

Curing is usually carried out by a chemical reaction that is triggered, for example by a gas directed through the moulding material mixture to be cured. In hot processes, the moulding material mixture is heated after moulding by the heated moulding tool to a sufficiently high temperature to drive, for example the solvent contained in the binder and/or to initiate a chemical reaction by which the binder is cured by crosslinking.

In the field of cold curing core manufacturing processes, the process water-glass-$CO_2$ was still widely applied in the 50s and 60s of the 20th century. In this process, as known from GB 654817, $CO_2$ is used for curing the water-glass-based inorganic binder. One of the weak points of this process is that cores produced therefrom have relatively low resistances, particularly immediately after their production. Furthermore, the water-glass-$CO_2$ process allows only low to medium production speed.

Good resistances however are necessary even after short curing periods to safely handle the increasingly complicated thin-walled casting moulds, as demanded increasingly frequently in these days, and at the same time to ensure high productivity. Therefore, it is not surprising that the water-glass-$CO_2$ process with the advent of processes based on organic binder rapidly lost its importance, particularly the so-called Ashland-Polyurethane-ColdBox process.

All organic binders however have the disadvantage that they pyrolyze when moulded and can release pollutants such as benzene, toluol or xylene. In addition, many organic binder systems emit solvents into the environment as early as during core production and storage or unpleasant smelling gases are used as curing catalyst. Although a number of measures reduce all of these emissions, they cannot be avoided when organic binders are used.

That is why, for some years there are increased efforts made again to develop the inorganic binders for the core production and the associated core production process.

In the field of cold-curing core production process, DE 102012103705.1 describes a further development of the water-glass-$CO_2$ process by combining $CO_2$-gassing with a second scavenging gas. To achieve high resistance with short cycle times, the path to carry out the curing in a hot tool was followed as well, and if necessary additionally hot air was directed through the moulding material mixture to drive out the water, which serves as solvent, as completely as possible. Such system is described in EP 1802409 B1 (U.S. Pat. No. 7,770,629). However, these heat curing processes have the disadvantage that the tools are carried out heated and the heating causes an additional energy consumption which represents a significant charging of costs for the process.

OBJECT OF THE INVENTION

Therefore, the inventors have set the task of developing a process which allows the production of moulds and cores using a water-glass-based inorganic binder, also in unheated tools, whereas the resistances with the same binder and an identical content of binder should be sufficiently higher than in the previously known production processes, particularly immediately after removal from the mould, such as the water-glass-$CO_2$ process.

SUMMARY OF THE INVENTION

This task is solved with a process that has the features as claimed below. According to the invention advantageous further developments of the process are the subject of other claims. The process comprises at least a) providing a moulding material mixture comprising at least one refractory basic moulding material and water glass as binder in a moulding box, b) introducing gas into the moulding box, comprising at least one carbonyl compound with a molecular weight greater than 43 g/mol and less than 200 g/mol, comprising in addition a carbonyl group (C=O) at least one more carbon atom to cure the moulding material mixture, whereas the carbonyl compound is characterized by the following formula $$R^1R^2C=O$$

wherein
$R^1$ stands for
one hydrogen atom,
one C1 to C3 hydrocarbon, preferably a C1 or C2 alkyl,
one substituted oxy group R—O—,
chlorine, or
bromine; and $R^2$ stands for
one substituted oxy group R—O—
one carboxyl group R—C(=O)—O— bonded via the oxygen atom, substituted with R,
one carbonate group (R—O—C(=O)—O—) bonded via the oxygen atom, substituted with R,
chlorine, or
bromine,
in each case independently from R=, hydrogen or C1 to C3 hydrocarbon, preferably C1 or C2 alkyl, whereas R for R1 and R for R2 can also form a ring.

Particularly the carbonyl compound is characterized by the following formula $R_1R_2C=O$ wherein
$R^1$ stands for
one hydrogen atom,
one C1 or C2 alkyl,
$R^2$ stands for
one carboxyl group R—C(=O)—O— bonded via the oxygen atom, substituted with R in each case independently from R=, C1 to C3 hydrocarbon, preferably C1 or C2 alkyl.

Particularly preferably is the carbonyl compound selected from one or more members of the group alkyl carbonates, carboxylic acid ester and carboxylic acid anhydrides, preferably carboxylic acid anhydrides and more preferably acetic anhydride and/or HC(=O)—O—C(=O)—$CH_3$.

Surprisingly it was found that moulds and cores can be produced by a moulding material mixture, comprising an inorganic water-glass-based binder, after which the following described processes can be prepared by means of a carbonyl compound. The resistances are sufficiently higher for cores that are produced in processes according to the invention particularly immediately after removal from the core box than for other known processes herein, such as curing with $CO_2$ and air.

In the process according to the invention, at first a moulding material mixture of at least one refractory basic moulding material and an inorganic, water-glass-based binder is produced, shaped and compacted. Afterwards a carbonyl compound is directed by means of a carrier gas, such as air or nitrogen as described below.

In the production of the moulding material mixture generally the refractory basic moulding material is produced and the binder is added with stirring. It is stirred until an even dispersion of the binder is ensured on the basic moulding material.

Subsequently the moulding material mixture is brought into the desired shape. The usual processes for moulding are applied. For example, the moulding material mixture can be shot into the mould by a core shooter by means of compressed air. Subsequently curing is carried out by the carbonyl compound according to the invention directed through the tool filled with the moulding material mixture by means of a carrier gas. For this purpose, the carbonyl compound according to the invention is, for example introduced with the aid of a dosing system, as it is integrated in modern gassing machine into the gas flow of the carrier gas. The dosage of the carbonyl compound, according to the invention, to the carrier gas is preferably carried out at the beginning of the rinsing process. A further possibility is to dose the carbonyl compound evenly to the carrier gas throughout the rinsing process.

DETAILED DESCRIPTION OF THE INVENTION

Preferred carbonyl compounds according to the invention of the general formula $R_1C(=O)—R_2$ are illustrated with Lewis-line formulas with regards to $R_1$ and $R_2$ (independent of each other).

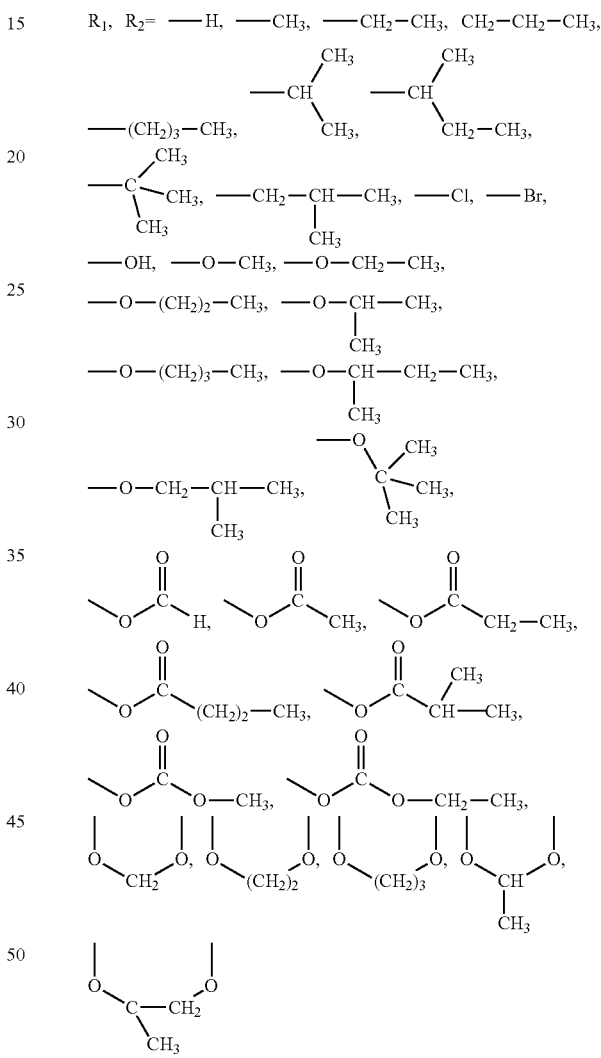

Here, one or more CH, $CH_2$ and $CH_3$ groups can also be replaced by CF, $CF_2$ and $CF_3$—however, such groups are not preferred due to environmental reasons. Further, $R_1$ and $R_2$ can be joined to form a ring (each replacing a hydrogen atom by means of the ring bond).

$R_1$ and $R_2$ stand independent from each other for the following substituents: hydrogen atom, alkyl groups having 1 to 4 carbon atoms, preferably with 1 to 2 carbon atoms and particularly preferably with a carbon atom, hydroxy groups bonded via its oxygen atom alkoxy groups having 1 to 4 carbon atoms, preferably 1 to 3 carbon atoms and particularly preferably having 1 or 2 carbon atoms bonded via its oxygen atom, carboxyl groups having 1 to 4 carbon atoms, preferably having 1 to 3 carbon atoms and particularly preferably having 2 carbon atoms and their oxygen-atom-bonded monoalkyl carbonates having 1 to 2 carbon atoms, chlorine atom and bromine atom.

Carbonyl compounds with $R_1$ or $R_2$ being one chlorine or bromine atom are less preferred since bromide may occur during the reaction with water hydrogen chloride or hydrogen.

Further carbonyl compounds according to the invention are cyclic carboxylic acid derivatives, that is compounds that are derived from the general formula outlined above, by $R_1$ and $R_2$ being connected to each other not only via the carbonyl group. For example, the carbonyl compound according to the invention has 5- or 6-rings in which the carbonyl carbon atom is incorporated.

The oxidation number of the carbonyl carbon of +III, +IV is preferred wherein especially the oxidation number +III is preferred. The oxidation number can be determined by assigning the bonding electrons to the more electronegative atom at the covalent bond. The underlying electronegativity values are based on the Allred-Rochow scale. Preferred is the more electronegative atom than an oxygen atom.

Independently thereof, carbonyl compounds are preferred in which the carbonyl carbon atom is surrounded by 2 or 3 oxygen atoms, wherein in a particularly preferably embodiment the carbonyl carbon atom is surrounded by two oxygen atoms.

At the same time in the preferred embodiment, the following substituents are selected for $R_1$: hydrogen bonded via the oxygen atom, alkoxy groups having 1 to 4 carbon atoms, preferably having 1 to 3 carbon atoms and particularly preferably having 1 to 2 carbon atoms, alkyl groups having 1 to 4 carbon atoms, preferably having 1 to 3 carbon atoms and particularly preferably having 1 or 2 carbon atoms, particularly preferably having one carbon atom. Particularly preferably for $R_1$ are alkyl groups having 1 to 4 carbon atoms, preferably having 1 to 3 carbon atoms and particularly preferably having 1 or 2 carbon atoms, particularly preferably selected with a carbon atom.

In a preferred embodiment the following substituents are selected for $R_2$: hydroxy groups bonded via its oxygen atom alkoxy groups having 1 to 4 carbon atoms, preferably with 1 to 3 carbon atoms and particularly preferably having 1 to 2 carbon atoms, and for your oxygen atom bonded carboxyl groups with 1 to 4 carbon atoms, preferably having 1 to 3 carbon atoms and particularly preferably having 2 carbon atoms. Particularly preferably for $R_1$ are carboxyl groups bonded via the oxygen atom having 1 to 4 carbon atoms, preferably having 1 to 3 carbon atoms and particularly preferably having 2 carbon atoms selected.

The carbonyl compound according to the invention preferably comprises two carbonyl groups which are particularly preferably direct linked to each other via an oxygen atom.

The carbonyl compound is preferably selected from the group of alkyl carbonate, carboxylic acid esters and carboxylic particularly preferably selected from the group consisting of carboxylic, of which acetic anhydride and/or HC(=O)—O—C(=O)—CH3 is/are particularly preferred.

It was particularly surprising for the inventors that the effect according to the invention can only be observed with the carbonyl compounds outlined above, while other carbonyl compounds have been found to be unsuitable.

The carbonyl compound according to the invention shows a melting point less than 100° C., preferably less than 50° C. and particularly preferably less than 10° C. at normal pressure (=1013 hPa).

The boiling point of the carbonyl compound according to the invention is preferably less than 200° C., particularly preferably less than 180° C. and most preferably less than 160° C. at normal pressure (=1013 hPa). In an even more preferred embodiment, the carbonyl compound according to the invention has a boiling point less than 143° C. at normal pressure (=1013 hPa).

The carbonyl compound according to the invention boils preferably above 20° C. more preferably above 30° C. and particularly preferably above 50° C. at normal pressure (=1013 hPa). In an even more preferred embodiment the boiling point of the carbonyl compound according to the invention is above 70° C.

The vapor pressure of the carbonyl compound according to the invention is at 20° C. preferably greater than 3 mbar and most preferably greater than 4 mbar. At the same time, the vapor pressure of the carbonyl compound according to the invention at 20° C. is preferably less than 700 mbar, particularly preferably less than 500 mbar and in particularly preferably less than 300 mbar. The above listed limitations are related to the vapor pressure as it can be calculated from the Antoine-Constants and as published in the database CHEMSAFE (Version 1.4.10 (2009)) of DECHEMA (Society for Chemical Engineering and Biotechnology).

The carbonyl compound according to the invention has at 20° C. a solubility in water of preferably greater than 10 g/l, particularly preferably greater than 50 g/l and more preferably greater than 100 g/l at normal pressure (=1013 hPa). The molar mass of the carbonyl compound according to the invention is preferably less than 200 g/mol, more preferably less than 150 g/mol and particularly preferably less than 120 g/mol. Furthermore, the carbonyl compound according to the invention has a molar mass of preferably greater than 43 g/mol, particularly preferably greater than 60 g/mol and particularly preferably greater than 80 g/mol.

Without being bound to the theory, the inventors assume that the carbonyl compound according to the invention serves as curing reagent. It is surprising that the effect according to the invention cannot be observed with other carbonyl compounds.

In what quantity the carbonyl compound according to the invention is used depends particularly on the weight of the core or of the cured moulding material mixture. With regards to the moulding material mixture, the required amount of the carbonyl compound according to the invention is less than 5 wt % and particularly preferably less than 1 wt %.

The minimum limit of the added amount of the carbonyl compound according to the invention is preferably greater than 0.01 wt %, preferably greater than 0.03 wt %, particularly preferably greater than 0.05 wt % and particularly preferably greater than 0.1 wt %.

According to another definition independent of the moulding material mixture, the carbonyl compound according to the invention is used in an amount preferably greater than 1.25 wt %, preferably greater than 3.75 wt %, more preferably greater than 6.25 wt % and particularly preferably greater than 12.5 wt %, related to the amount of alkali silicate added by the water glass binder to the moulding, calculated as the sum of $Na_2O$, $K_2O$, $Li_2O$ and $SiO_2$. At the same time the added carbonyl compound according to the invention, based on the amount of alkali silicate, is less than 625 wt %, preferably less than 250 wt % and particularly preferably less than 125 wt %.

Independently of this, the molar ratio of the molar amount of the alkali metal M to the added molar amount of the carbonyl compound according to the invention, added by the water glass binder to the moulding material mixture, is preferably 10:1 to 1:1, particularly preferably 8:1 to 2:1 and most particularly preferably 6:1 to 3:1.

The three definitions described above may also apply simultaneously side by side.

For the carrier gas which is used to transport the carbonyl compound according to the invention to the moulding material mixture, air and nitrogen and particularly air are preferred due to economic reasons. The gassing temperature of the carrier gas is above 10° C., preferably above 20° C. and more preferably above 35° C. The gassing temperature refers here, as well as in the description of the process according to the invention to the temperature displayed by the gas as it enters the mould. An upper limit does not exist. Primarily economic reasons speak against the use of very high temperatures since the prices of the necessary heater rise with increasing power and the costs of an effective insulation of the wires are very high.

In the case of air being carrier gas, it usually can be taken from the existing compressed air line system in the casting houses so that the pressure therein, for merely practical reasons, displays the upper limit for gassing. The lower limit is located at about 0.5 bar, preferably at approximately 2 bar and particularly preferably at approximately 3 bar to ensure an effective transport of the carbonyl compound to the moulding material mixture. The upper limit can be 10 bar, for example, and results from the pressure carrying capacity of the moulding box. With less pressure, the gassing time would greatly extend and result in a loss of productivity.

If in the present protective right reference is made to a moulding box, it indicates that the moulding box for the production of moulds and cores, particularly cores, can be used and thus includes a core box.

All pressure data, refer respectively to overpressure, that is a pressure above the ambient pressure, unless otherwise stated.

Equipments known from Polyurethane-Cold-Box processes in which an organic two-component binder system, a phenol resin and a polyisocyanate is cured by a catalyst, a liquid amine at room temperature—for this purpose, the liquid catalyst is placed in the vapor/gas phase and fed by means of a carrier gas through the moulding material mixture to be cured—can also be used for the present process. A general description of Ashland-Polyurethane ColdBox process can be found in the Casting Lexicon by Hasse et al. (19th edition, Schiele & Schöne Verlag 2008) under the heading Cold-Box (Section: PUR-Cold-Box: pp. 198 and 199). In the present invention, the carbonyl compound takes the role of the curing reagent for the water-glass-based binder. When material is incompatible with a device from the Polyurethane-Cold-Box process, the corresponding parts of the equipment are replaced with materials which are resistant to the carbonyl compounds according to the invention.

The carbonyl compound is, for example liquid and is supported by a carrier medium in the moulding box either as aerosol or preferably gaseous. The pressure buildup can happen, for example if the injection openings are larger than the ejection openings. Unused carbonyl compound can be driven out by subsequent purge gas.

A suitable equipment is illustrated in FIG. 1 as example. Through the air supply (4) air is blown as a carrier gas in the direction of arrow (1) through an opening in the gassing cover (3) into the moulding box (5). The carbonyl compound is introduced here via the T-fitting (2) and entrained gaseous.

The gassing time is based on the weight and geometry of the core. By means of suitable choice of gassing parameter and the layout of the tools it can be ensured that it is possible even with longer periods of core manufacturing similar to those of organic binders, for example less than 3 minutes, preferably less than 2.5 minutes and most preferably less than 2 minutes. Such optimization can, if necessary be carried out with the help of computer simulation.

According to another embodiment, the carrier gas can be mixed with $CO_2$, or additionally $CO_2$ or a $CO_2$-containing gas can be used with the carrier gas to affect, if necessary the resistances of the cores. One possible embodiment is described in DE 102012103705.1.

Using existing heatable moulding tools is not excluded in the process described. By means of the process according to the invention, the possibility to use the tools either cold, at ambient or room temperature of 15 to 30° C. or at lower than the usual temperature when operating at the heat-curing process, that is lower than 200° C. or lower than 120° C. or even lower than 100° C., particularly more favorable non-heatable tools can be used to reduce costs. The process according to the invention does not exclude to treat the cores or moulds with an additional heat treatment.

It is possible to modify the curing of the moulding material according to the invention by known processes, for example by applying a vacuum. Further steps can also be connected to the actual curing, for example treatment with microwaves or heating in the oven.

As refractory basic moulding material customary and known materials can be used for the production of casting moulds. Suitable are for example silica, zircon or chromite, olivine, vermiculite, bauxite, chamotte and synthetic basic moulding materials, particularly more than 50 wt % silica sand based on the refractory basic moulding material. It is not necessary to use exclusively new sand. To protect resources and avoid landfill costs, it even is advantageous to use a high proportion of recycled used sand obtainable from used moulds by recycling.

A refractory basic moulding material is understood as substances that have a high melting point (melting temperature). Preferably the melting point of the refractory basic moulding material is greater than 600° C., preferably greater than 900° C., more preferably greater than 1200° C. and particularly preferably greater than 1500° C.

The refractory basic moulding material comprises preferably greater than 80 wt %, particularly greater than 90 wt %, particularly preferably greater than 95 wt % of the moulding material mixture.

A suitable sand is described, for example in WO 2008/101668 A1 (=US 2010/173767 A1). Also suitable reclaims are used which are obtainable by washing and subsequent drying comminuted used moulds. Less preferred are reclaims which were obtained by purely mechanical treatment. Usually reclaims can be at least about 70 wt % of the refractory basic moulding material, preferably at least about 80 wt % and more preferably greater than 90 wt %.

The average diameter of the refractory basic moulding materials is generally between 100 μm and 600 μm, preferably between 120 μm and 550 μm and more preferably between 150 μm and 500 μm. The medium particle size can be determined, for example by sieving according to DIN 66165 (Part 2) with test sieves DIN ISO 3310-1. Particularly preferably are particle shapes with the greatest linear expansion to the smallest linear expansion (perpendicular to each other and each for all spatial directions) of 1:1 to 1:5 or 1:1 to 1:3, that is such that are not fibrous.

The refractory basic moulding material is preferably in a free-flowing condition to be able to particularly process the moulding material mixture according to the invention in conventional core shooters.

The process according to the invention is particularly suitable for inorganic-based water glass binders. The water glasses contain dissolved alkali silicates and can be prepared by dissolving vitreous lithium, sodium and potassic silicates in water. The water glass has preferably a molar module $SiO_2/M_2O$ within the range of 1.6 to 4.0, particularly 2.0 to less than 3.5 wherein $M_2O$ is the sum of lithium, sodium and potassium oxide. The binders can also be based on water glasses that contain more than one of the above alkali metal ions, such as known lithium modified water glasses from DE 2652421 A1 (=GB1532847 A). Furthermore, the water glasses can also contain multivalent ions such as the aluminum-modified water glasses described in EP 2305603 A1 (=WO 2011/042132 A1). According to a particular embodiment, a water glass with a defined proportion of lithium ions or a ratio $[Li_2O]/[M_2O]$ or $[Li_2O_{active}]/[M_2O]$ is used. $[Li_2O]$ or $[Li_2O_{active}]$ is calculated as the percentage of the existing amorphous lithium silicates, lithium oxides and lithiumhydroxiden found in the water glass as described in DE 1 0201 31 06276 A1.

The water glasses have solids content ranging from 25 to 65 wt %, preferably from 30 to 55 wt %, particularly from 30 to 50 wt %. The solids content refers to the amount of $SiO_2$ and $M_2O$ contained in the water glass.

Depending on the application and desired level of resistance, between 0.5 wt % and 5 wt % of the water-glass-based binder is used, preferably between 0.75 wt % and 4 wt %, more preferably between 1 wt % and 3.5 wt %, in each case based on the basic moulding material. The figures refer to the total amount of the water glass binder including (especially aqueous) the solvent or diluent and the (possible) solid content (total=100 wt %).

The moulding material mixture according to the invention comprises, in a further embodiment, a proportion of a particulate amorphous silica to increase the resistance level of the casting moulds produced with such moulding material mixtures. Here, particularly preferably is synthetically produced amorphous silica.

The particle size of the amorphous silica is preferably less than 300 µm, preferably less than 200 µm, more preferably less than 100 µm and has an average primary particle size between 0.05 µm and 10 µm. The sieve residue of the particulate amorphous $SiO_2$, in one pass through a sieve with 125 µm mesh size (120 mesh) is preferably not more than 10 wt %, particularly preferably not more than 5 wt % and very particularly preferably not more than 2 wt %. Irrespectively, the sieve residue on a sieve with a mesh size of 63 µm is less than 10 wt %, preferably less than 8 wt %. The determination of sieve residue or a particle size distribution by sieving is carried out in the present case according to the machine sieve process described in DIN 66165 (part 2), resulting in an additional chain ring used as sieving aid.

The preferably used particulate amorphous silica according to the present invention has a water content of less than 15 wt %, particularly less than 5 wt % and particularly preferably less than 1 wt %. The particularistic amorphous $SiO_2$ is particularly used as a powder (including dust).

Both synthetic and naturally occurring silica can be used as amorphous $SiO_2$. The latter is, for example known from DE 102007045649 but not preferred because it usually contains considerable crystalline fractions and is therefore classified as carcinogenic substance.

Synthetic is not understood as naturally occurring amorphous $SiO_2$, that is its preparation includes a consciously carried out chemical reaction caused by a human being, for example the production of silica sols by ion exchange processes of alkali silicate solutions, the precipitation of alkali silicate solutions, the flame hydrolysis of silicon tetrachloride, the reduction of silica sand with coke in an electric arc furnace when producing ferrosilicon and silicon. The amorphous $SiO_2$ produced by the two last-mentioned processes is also referred to as pyrogenic $SiO_2$.

Occasionally, synthetic amorphous silica is understood as precipitated silica pigments (CAS-No. 112926-00-8) and $SiO_2$ produced by means of flame hydrolysis (Pyrogenic Silica, Fumed Silica, CAS-No. 12945-52-5 5), while the product resulting from the ferrosilicon or silicon production is described only as amorphous silica (Silica Fume, Micro-silica, CAS-No. 69012-64-12). For the purposes of the present invention, the product resulting from the ferrosilicon or silicon manufacturing production is understood as amorphous $SiO_2$.

Precipitated silica pigments and pyrogenic, that is flame hydrolysis or silica produced in the electric arc are preferably used. Particularly preferably used are amorphous silica produced by thermal decomposition of $ZrSiO_4$ (described in DE 102012020509) and by oxidation of metallic Si by means of an oxygenic $SiO_2$ (described in DE 102012020510). Preferred is also silica glass powder (basically amorphous silica), which was prepared by melting and rapid re-cooling of crystalline silica so that the particles are spherical and not splintery (described in DE 102012020511). The average primary particle size of the particulate amorphous silica can be between 0.05 µm and 10 µm, in particular between 0.1 and 5 µm, particularly preferably between 0.1 µm and 2 µm. The primary particle size can, for example be determined by means of dynamic light diffusion (for example, Horiba LA 950) and examined by means of scanning electron micrographs (SEM micrograph with Nova NanoSEM 230 of the company FEI). With the aid of the SEM micrograph, details in the scale of 0.01 µm of the primary particles form could furthermore be made visible. The silica samples were dispersed for the SEM measurements in distilled water and subsequently applied to an adherent and added on an aluminum support glued with copper tape, before the water was evaporated.

Furthermore, the specific surface of the particulate amorphous silica was determined by means of gas adsorption measurements (BET method) in accordance with DIN 66131. The specific surface area of the particulate amorphous $SiO_2$ is between 1 and 200 $m^2/g$, particularly between 1 and 50 $m^2/g$, more preferably between 1 and 30 $m^2/g$. If necessary, the products can be mixed, for example to selectively obtain mixtures with certain particle size distributions.

The purity of the amorphous $SiO_2$ vary greatly depending on the method of production and producer. Types having a content of at least 85 wt % silica proved to be suitable, preferably at least 90 wt % and particularly preferably at least 95 wt %. Depending on the application and the desired level of resistance, between 0.1 wt % and 2 wt % of the particulate amorphous $SiO_2$ is used, preferably between 0.1 wt % and 1.8 wt %, particularly preferably between 0.1 wt % and 1.5 wt %, in each case based on the basic moulding material.

The ratio of water glass binder to particulate amorphous silica can be varied within wide limits. This offers the advantage of starting resistances of the cores, that is resistance immediately after removal from the tool to improve immensely without considerably affecting the final resistance. This is especially of great interest in aluminum alloy casting. On the one hand high initial strengths are desirable to transport the seeds to their production problems or to be able to put all core packages together, on the other hand the final resistance should not be too high in order to avoid difficulties in nuclear disintegration after casting, that is the basic moulding material should be able to easily be removed from hollow spaces of the casting mould after casting.

Based on the total weight of the water glass binder (including diluents or solvents), the amorphous $SiO_2$ contains a proportion of 1 to 80 wt %, preferably from 2 to 60 wt %, most preferably from 3 to 55 wt % and particularly preferably between 4 to 50 wt %. Independently of this, an addition amount of the amorphous $SiO_2$ based on the ratio of solids content of the water glass (based on the oxides, that is total mass of alkali metal oxide and silica) to amorphous $SiO_2$ from 10:1 to 1:1.2 (parts by weight) is preferred.

The adding of amorphous silica can be carried out both before and after adding the binder directly to the refractory material according to EP 1802409 B1, but it can first also be a master batch of $SiO_2$ with at least one part of the binder or caustic soda solution and mixed with the refractory material as described in EP 1884300 A1 (=US 2008/029240 A1). The possibly still present binder or binder component, yet not used for the master batch, can be added to the refractory material before or after adding the master batch or in conjunction with it. Preferably the amorphous $SiO_2$ is added to the refractory material prior to adding the binder.

Barium sulfate can be added in a further embodiment to the moulding material mixture in order to further improve the surface of the casting, particularly made of aluminum.

The barium sulfate can be synthetically produced or natural, that is it can be added in form of minerals containing barium sulfate such as barite or baryte. This and other features of the appropriate barium sulfate as well as the moulding material mixture produced with it are specified in DE 102012104934 and its disclosure is made so-far by referring also to the disclosure of the present protective right. The barium sulfate is preferably added in an amount between 0.02 and 5.0 wt %, particularly preferably from 0.05 to 3.0 wt %, particularly preferably from 0.1 to 2.0 wt % or from 0.3 to 0.99 wt %, in each case based on the entire moulding material mixture.

In a further embodiment, at least aluminum and/or aluminum/silicon mixed oxides can be added in particulate form, or metal oxides of aluminum and zirconium in particulate form are present in concentrations between 0.05 wt % and 4.0 wt %, preferably between 0.1 wt % and 2.0 wt %, particularly preferably between 0.1 wt % and 1.5 wt % and particularly preferably between 0.2 wt % and 1.2 wt %, each based on the moulding material mixture, moulding material mixture according to the invention as specified in DE 102012113073 and DE 102012113074.

To that extent these documents assert a claim made by referencing and disclosure of the present invention. By means of such additives metal castings can be obtained after the cast particularly of iron or steel with very high surface quality so that after removal of the casting mould only a small or even no further treatment of the surface of the casting is required.

In another embodiment, the moulding material mixture according to the invention can comprise a phosphorus-containing compound. This addition is preferred at very thin sections of casting mould. These are preferably inorganic phosphorus compounds in which the phosphor is preferably in oxidation state +5.

The phosphorus-containing compound is preferably in form of a phosphate or phosphorus oxide. The phosphate may be present as alkali metal or alkaline earth metal phosphate as with alkali metal phosphates and here the sodium salts are particularly preferred.

As phosphates both orthophosphates and polyphosphates, pyrophosphates or metaphosphates can be used. The phosphates can also be produced by an alkaline earth metal produced for example by neutralization of the corresponding acids with an appropriate base such as an alkali metal base, such as NaOH, where all negative charges of the phosphate must not necessarily be saturated by metal ions.

Both metal phosphates and metal hydrogen phosphates as well as metal hydrogen phosphate can be used, such as $Na_3PO_4$, $Na_2HPO_4$ and $NaH_2PO_4$. Likewise, the anhydrous phosphates and hydrates of the phosphates can be used. The phosphates can be added in the moulding material mixture both in crystalline and amorphous form.

Polyphosphates are particularly understood as linear phosphates comprising more than one phosphorus atom, wherein the phosphorus atoms are linked to each other via oxygen bridges.

Polyphosphates are obtained by condensation of orthophosphate ions under dehydration so that a linear chain of $PO_4$ tetrahedrons is obtained, with each being connected by corners. Polyphosphates show the general formula $(O(PO_3)_n)^{(n+2)-}$, wherein n is equivalent to the chain length. A polyphosphate may include up to several hundred $PO_4$ tetrahedrons. However, polyphosphates are preferably used with shorter chain lengths. Preferably n is from 2 to 100, particularly preferably from 5 to 50. Highly condensed polyphosphates can also be used, that is polyphosphates in which the $PO_4$ tetrahedrons are connected via more than two corners and therefore show a polymerization in two or three dimensions.

Metaphosphates are understood as cyclic structures which are composed of $PO_4$ tetrahedrons, connected to one another via corners. Metaphosphates have the general formula $((PO_3)n)^{n-}$, wherein n is at least 3. Preferably n having values from 3 to 10.

Both individual phosphates as well as mixtures of different phosphates and/or phosphorus oxides are used.

The preferred proportion of phosphorus-containing compound, based on the refractory basic mould material is between 0.05 and 1.0 wt %. The proportion of the phosphorus-containing compound is preferably selected between 0.1 and 0.5 wt %. The phosphorus-containing inorganic compound comprises preferably between 40 and 90 wt %, particularly preferably between 50 and 80 wt %, phosphorus calculated as $P_2O_5$. The phosphorus-containing compound may be added per se in solid or dissolved form of the moulding material mixture. The phosphorus-containing compound of the moulding material mixture is preferably added as a solid.

According to an advantageous embodiment, the moulding material mixture according to the invention comprises a proportion of flaky shaped lubricants, particularly graphite or $MoS_2$. The amount of the flaky shaped lubricant, particularly graphite is preferably 0.05 to 1 wt %, particularly preferably 0.05 to 0.5 wt %, based on the basic moulding material.

According to a further advantageous embodiment surface active substances can also be used, particularly surfactants which improve the flowability of the moulding material mixture. Suitable representatives of these compounds are specified, for example in WO 2009/056320 (=US 2010/0326620 A1). Preferably anionic surfactants are used for the moulding material mixture according to the invention. Here particularly surfactants with sulfuric acid or sulfonic acid groups are addressed. In the moulding material mixture according to the invention of the pure surfactant particularly preferably the surfactant based on the weight of the refractory basic moulding material proportion of 0.001 to 1 wt %, particularly preferably 0.01 to 0.2 wt %.

According to a further advantageous embodiment the moulding material mixture comprises also one or more powdered oxidic boron compounds in addition to the refractory basic moulding material, water glass as a binder and the particulate amorphous silica. For oxidic boron compound the followings are suitable: borates, boric acids, boric anhydrids, borosilicates, borophosphates, boro phosphosilicates and their mixtures and particularly borates such as alkali and/or alkaline earth metal borates, wherein the oxidic boron compound is preferably not comprising organic groups and the oxidic boron compound B—O—B is composed of structural elements.

The oxidic boron compound, based on the refractory basic moulding material is to be greater than 0.002 wt % and less than 1.0 wt %, preferably greater than 0.005 wt % and less than 0.4 wt %, particularly preferably greater than 0.01 wt % and less than 0.2 wt % and particularly preferably greater than 0.02 wt % and less than 0.1 wt %, comprised in the moulding material mixture or added to the moulding material mixture.

In another embodiment the moulding material mixture according to the invention can be added (according to EP 1802409B1 and WO2008/046651) with the additive component organic compounds such as carbohydrates. A small addition of organic compounds may be advantageous for specific applications—for example to regulate the thermal expansion of the cured moulding material mixture. However, such an addition is not preferred since this, in turn, is connected to emissions of $CO_2$ and other pyrolysis products.

According to one embodiment of the invention, the moulding mixture comprises organic components in a proportion up to a maximum of 0.49 wt %, particularly up to a maximum of 0.19 wt % wherein the carbonyl compound according to the invention is excluded here, that is the carbonyl compounds of the invention are not counted on the addition of the organic components.

EXAMPLES

1. Production of Moulding Material Mixtures

In each case 100 parts by weight (pbw) silica sand H 32 by the company Quarzwerke Frechen GmbH were added in a bowl of a mixer by the company Hobart (Model HSM 10) and subsequently 0.5 parts by weight (pbw) of amorphous $SiO_2$ (Microsilica POS B-W 90 LD by the company Possehl Erzkontor GmbH) was added and mixed for one minute. While stirring, 2 pbw of the binder were added and mixed intensively for one minute with the sand. The binder that was produced the day before the experiment by mixing consisted of 90.9 pbw nuclesil 80 BASF SE (molar ratio $[SiO_2]/[M_2O]$ about 2.32, solid content: about 43.6%) and 9.1 pbw demineralized water.

2. Production of Test Specimens

To test the moulding material mixtures, rectangular test tubes were produced having dimensions of 150 mm×22.36 mm×22.36 mm (so-called Georg-Fischer tubes). A portion of the first produced moulding material mixtures was transferred in the storeroom of a core shooter H 1 by the company Röper Werke AG. The rest of the moulding material mixtures were kept in a tightly closed vessel until the replenishment of the core shooter to protect it from drying out and premature reaction with the $CO_2$ present in the air. From the pantry, the moulding material mixtures were added by means of compressed air (4 bar) into the moulding tool. Subsequently the test cores were cured as follows:

2.1 Curing with Air

The core box was rinsed with air for 60 seconds, with temperatures being approximately 25° C. (room temperature). Furthermore, nuclei were produced by means of rinsing the moulding tool with air for 45 seconds. In this case, the temperature of the air as measured at the inlet into the moulding tool was 50° C. In both cases, the air pressure was 4 bar.

2.2 Curing by Combination of $CO_2$ and Air

When combining $CO_2$ and air, the moulding tool was first rinsed for one second with $CO_2$ and subsequently for 59 seconds with air. Both air and $CO_2$ were used at room temperature (approx. 25° C.) and at a pressure of 4 bar.

2.3 Curing by Acetic Anhydride and Air as Carrier Gas

The dosage of acetic anhydride was carried out using a laboratory syringe that had a volumetric scale. After absorption of the required amount of acetic anhydride, it was injected via a T-fitting in the air supply line to the moulding tool. FIG. 1 illustrates the experimental arrangement used here. The distance between the T-fitting and the gassing cover was about 1.5 m. After the injection of the acetic anhydride, the moulding tool was rinsed with air via the air supply line for 60 seconds. The air used was at room temperature (ca. 25° C.) and at a pressure of 4 bar. The respective added amount of acetic anhydride is summarized in Table 2.

3. Tests of Resistance of Produced Specimens

To determine the flexural resistance, the test bars were removed from the moulding tool and inserted in a Georg Fischer resistance-measuring apparatus, equipped with a 3-point flexural characteristics to measure the force which led to fracture of the test tubes. The flexural resistances were both determined directly, that is a maximum of 10 seconds after the removal (immediate resistance) as well as 24 hours after the production (final resistance).

The results of resistance tests are illustrated in Table 1. The values given here are average values from multiple measurements at minimum 4 cores.

4. Results

For examples 1.1 and 1.2 the specimens were cured with only air, whereas in examples 1.3 and 1.4, a combination of $CO_2$ and air was used for curing. The examples 2.1 to 2.10 are for test specimens which were hardened with the process according to the invention, wherein air was used as carrier gas. The respective gassing temperature, at the inlet of the moulding tool, and the gassing time are summarized in Table 1 and 2 as well.

TABLE 1

Examples not according to the invention. Test conditions and results for curing with air or by combining air and $CO_2$. The added amount of the binder (composition: 90.9 pbw Nuclesil 80 by BASF SE (molar ratio $[SiO_2]/[M_2O]$ about 2.32, solid content: about 43.6%) and 9.1 pbw demineralized water) was in all examples 2 parts by weight. The added amount of amorphous $SiO_2$ (Microsilica POS B-W 90 LD by the company Possehl Erzkontor GmbH) was in all examples 0.5 parts by weight.

| example number | gassing time $CO_2$ [sec] | gassing time air [sec] | temperature of $CO_2$ or air [° C.] | immediate resistance [N/cm²] | final resistance [N/cm²] |
|---|---|---|---|---|---|
| Curing with air | | | | | |
| 1.1 | 0 | 60 | 25° C. | 75 | 283 |
| 1.2 | 0 | 45 | 50° C. | 93 | 173 |
| curing by combining $CO_2$ and air | | | | | |
| 1.3 | 1 | 59 | 25° C. | 90 | 243 |
| 1.4 | 1 | 44 | 50° C. | 110 | 190 |

TABLE 2

Examples according to the invention; test conditions and results for curing the process according to the invention, wherein acetic anhydride was used. In all examples air was used as carrier gas. The added amount of binders (composition: 90.9 pbw Nuclesil 80 by BASF SE (molar ratio [SiO$_2$]/[M$_2$O] about 2.32, solid content: about 43.6%) and 9.1 pbw demineralized water) was 2 parts by weight in all instances; the added amount of amorphous SiO$_2$ (Micro Silica POS B-W 90 LD by the company Possehl Erzkontor GmbH) was 0.5 parts by weight in all examples.

| example number | gassing time CO$_2$ [sec] | gassing time acetic anhydride [sec] | temperature of air [° C.] | immediate resistance [N/cm$^2$] | final resistance [N/cm$^2$] |
|---|---|---|---|---|---|
| | | curing by acetic anhydride and air as a carrier gas | | | |
| 2.1 | 60 | 0.2 | 25° C. | 95 | 280 |
| 2.2 | 60 | 0.4 | 25° C. | 125 | 260 |
| 2.3 | 60 | 0.5 | 25° C. | 130 | 290 |
| 2.4 | 60 | 1.0 | 25° C. | 135 | 260 |
| 2.5 | 45 | 0.1 | 50° C. | 103 | 180 |
| 2.6 | 45 | 0.3 | 50° C. | 185 | 195 |
| 2.7 | 45 | 0.5 | 50° C. | 220 | 225 |
| 2.8 | 45 | 0.6 | 50° C. | 165 | 235 |
| 2.9 | 45 | 0.7 | 50° C. | 175 | 205 |
| 2.10 | 45 | 1.0 | 50° C. | 160 | 203 |

In Table 1, two different curing process not according to the invention are compared to each other: curing with air and curing by combining CO$_2$ and air. Comparison of the results shows that the immediate resistances can be increased by CO$_2$ while it has no significant influence on the final resistances.

Table 2 summarizes the results for the process according to the invention. In comparison to examples 1.1 and 1.2 for curing with air, the values for the immediate resistances show significantly higher values than the examples 2.1 to 2.10 according to the invention. This effect is particularly evident at a gassing temperature of 50° C. The immediate resistances can be increased by up to 80% at a gassing temperature of 25° C., at a gassing temperature of 50° C., more than twice as high as immediate resistances are possible by the process according to the invention.

Comparing the values of examples 1.3 and 1.4 for combining CO$_2$ and air with the examples 2.1 to 2.10 according to the invention, there is also a significant increase in immediate resistance to recognize. In that way the immediate resistance can be increased at a gassing temperature of 25° C. at the examples according to the invention up to 50%, at a gassing temperature of 50° C. even a doubling of the immediate resistance is possible.

Furthermore, tables 1 and 2 show that the gassing time can be shortened from 60 seconds to 45 seconds by increasing the gassing temperature from 25 to 50° C. While the final resistances are lower at the shorter gassing time of 45 seconds and gassing temperature of 50° C., the immediate resistances increase.

Examples 2.1 to 2.10 show that the immediate resistances depend strongly on the used amount of acetic anhydride. The effect according to the invention can clearly be seen particularly from an added amount of 0.3 ml. In a gassing temperature of 50° C., an optimum at 0.5 ml can be seen with regards to the added amount of acetic anhydride. For higher added amounts of acetic anhydride, immediate resistances decrease at this temperature although the measured immediate resistances for an added amount in excess of 0.5 ml are still higher than curing with air or by combining CO$_2$ and air.

The invention claimed is:

1. A process for producing moulds and cores comprising the steps of:
   providing, in a moulding box, a moulding material mixture comprising at least one refractory basic moulding material and water glass as binder, and
   introducing, into the moulding box, to cure the moulding material mixture, a gas comprising at least one carbonyl compound, the at least one carbonyl compound having the following features:
   a molecular weight greater than 88 g/mol and less than 200 g/mol;
   a boiling point at 1013 hPa between 20° C. and 200° C.; and
   in addition to a carbonyl group (C=O), at least one further carbon atom, the at least one carbonyl compound having the formula $R^1R^2C{=}O$ 

wherein
   $R^1$ is H or a C1 or C2 alkyl, and
   $R^2$ is a carboxyl group R—C(=O)—O— bonded via the —O— moiety, where R is a C1 to C3 hydrocarbon.
2. The process according to claim 1, wherein the at least one carbonyl compound is selected from the group consisting of: alkyl carbonates, carboxylic acid esters and carboxylic anhydrides.
3. The process according to claim 1, wherein the at least one carbonyl compound has a molecular weight greater than 88 g/mol and less than 150 g/mol;
   a boiling point at 1013 hPa that is greater than 20° C. and less than 200° C.; and
   a vapor pressure at 20° C. that is greater than 3 mbar and less than 700 mbar.
4. The process according to claim 1, wherein, in the introducing step, a stream of carrier gas introduces the at least one carbonyl compound into the moulding box, wherein the carrier gas has at least one of the following features:
   the carrier gas is selected from the group consisting of: air, nitrogen, carbon dioxide and mixtures thereof;
   the carrier gas stream has a temperature greater than 10° C. and less than 120° C.; and
   the carrier gas is introduced into the moulding box at a gauge pressure greater than 0.5 bar.
5. The process according to claim 1, comprising the further step of:
   heating the moulding box by introducing a gas stream.
6. The process according to claim 1, wherein the moulding material mixture has at least one of the following features:
   greater than 80 wt % is the refractory basic moulding material, based on the moulding material mixture, contained in the moulding material mixture;
   between 0.5 wt % and 5 wt % water glass, including water, and relative to the basic moulding material contained in the moulding material mixture; and
   between 0.1 wt % and 3.5 wt % water glass is contained in the moulding material mixture, based on the solid content of alkali silicates defined as M$_2$O and SiO$_2$ of the water glass and relative to the moulding material mixture, wherein M$_2$O is the sum of lithium-, sodium- and potassium-oxide.
7. The process according to claim 1, wherein the moulding material mixture has at least one of the following features:

greater than 0.01 to less than 5 wt % of the carbonyl compound, based on the moulding material mixture, is contained in the moulding material mixture or is admixed to it;

greater than 1.25 wt % to less than 625 wt % of the carbonyl compound is used, relative to the amount of alkali silicate added to the moulding material by the water glass binder and calculated as the sum of $Na_2O$, $K_2O$, $Li_2O$ and $SiO_2$, and water glass binder, calculated as the molar quantity of the alkali metals M, and the carbonyl compound are added in a molar ratio of 10:1 to 1:1.

8. The process according to claim 1, wherein the refractory basic moulding material has at least one of the following features:
the refractory basic moulding material comprises more than 50 wt % silica sand with reference to the refractory basic moulding material;
the refractory basic moulding material has a melting temperature of greater than 600° C.; and
the refractory basic moulding material has an average particle diameter of 100 μm to 600 μm, determined according to standard test method DIN 66165 (Part 2) with test sieves in accord with test standard DIN ISO 3310-1.

9. The process according to claim 1, wherein the refractory basic moulding material comprises silica, zircon or chrome ore sand, olivine, vermiculite, bauxite, chamotte, glass beads, glass granules, aluminum silicate micro hollow balls and their blends, based on the refractory basic moulding material.

10. The process according to claim 1, wherein the moulding material mixture comprises particulate amorphous silicon dioxide that is added as a component separate from the water glass and separately from the refractory basic moulding material to the moulding material mixture.

11. The process according to claim 10, wherein the moulding material mixture is further characterized by at least one of the following features:
0.1 to 2 wt % particulate amorphous silicon dioxide is contained in the moulding material mixture relative to the refractory basic moulding material;
2 to 60 wt % of particulate amorphous silicon dioxide, relative to the weight of the water glass (including water), is contained in the moulding material mixture, wherein the solid content of the water glass is 25 to 65 wt %; and
4 to 50 wt % particulate amorphous silicon dioxide, relative to the weight of the water glass, is contained in the moulding material mixture, wherein the weight of the water glass is defined in each case based on the solid content of alkali silicates in the form of $M_2O$ and $SiO_2$, wherein $M_2O$ is the sum of lithium, sodium and potassium oxide.

12. The process according to claim 10, wherein the particulate amorphous silicon dioxide has a specific surface area, according to BET method, between 1 and 200 $m^2/g$.

13. The process according to claim 12, wherein the particulate amorphous silicon dioxide has a specific surface area, according to BET method, greater than or equal to 1 $m^2/g$ and less than or equal to 30 $m^2/g$.

14. The process according to claim 13, wherein the particulate amorphous silicon dioxide has a specific surface area, according to BET method, greater than or equal to 1 $m^2/g$ and less than or equal to 15 $m^2/g$.

15. The process according to claim 10, wherein the particulate amorphous silicon dioxide has an average primary particle diameter determined by dynamic light scattering between 0.05 μm and 10 μm.

16. The process according to claim 10, wherein the particulate amorphous silicon dioxide is selected from the group consisting of: precipitated silica, flame hydrolytic or in electric arc produced fumed silicon dioxide, amorphous silicon dioxide produced by means of thermal decomposition of $ZrSiO_4$, silicon dioxide produced by oxidation of metallic silicon by an oxygen-containing gas, silica glass powder comprising spherical particles, which was prepared by melting and rapid cooling back from crystalline silicon dioxide, and mixtures thereof.

17. The process according to claim 10, wherein the particulate amorphous silicon dioxide used has a water content of less than 15 wt %.

18. The process according to claim 10, wherein the moulding material mixture is further characterized by at least one of the following features:
0.1 to 1.5 wt % particulate amorphous silicon dioxide is contained in the moulding material mixture relative to the refractory basic moulding material;
4 to 50 wt % of particulate amorphous silicon dioxide, relative to the weight of the water glass (including water), is contained in the moulding material mixture, wherein the solid content of the water glass is 30 to 55 wt %; and
4 to 50 wt % particulate amorphous silicon dioxide, relative to the weight of the water glass, is contained in the moulding material mixture, wherein the weight of the water glass is defined in each case based on the solid content of alkali silicates in the form of $M_2O$ and $SiO_2$, wherein $M_2O$ is the sum of lithium, sodium and potassium oxide.

19. The process according to claim 10, wherein the particulate amorphous silicon dioxide has an average primary particle diameter determined by dynamic light scattering between 0.1 μm and 5 μm.

20. The process according to claim 19, wherein the particulate amorphous silicon dioxide has an average primary particle diameter determined by dynamic light scattering between 0.1 μm and 2 μm.

21. The process according to claim 10, wherein the particulate amorphous silicon dioxide used has a water content of less than 5 wt %.

22. The process according to claim 21, wherein the particulate amorphous silicon dioxide used has a water content of less than 1 wt %.

23. The process according to claim 1, wherein the water glass has a molar module $SiO_2/M_2O$ in the range of 1.6 to 4.0, wherein $M_2O$ is the sum of lithium-, sodium- and potassium oxide.

24. The process according to claim 1, further comprising the step of:
exposing the moulding material mixture to a gas stream with a temperature of 100 to 300° C. after exposing the moulding material to the at least one carbonyl compound.

25. The process according to claim 1, wherein the at least one carbonyl compound is acetic anhydride.

26. The process according to claim 1, wherein the at least one carbonyl compound has a molecular weight greater than 88 g/mol and less than 120 g/mol.

27. The process according to claim 1, wherein the at least one carbonyl compound has a boiling point at 1013 hPa that is greater than 30° C. and less than 180° C.

28. The process according to claim 1, wherein the at least one carbonyl compound has a boiling point at 1013 hPa that is greater than 50° C. and less than 160° C.

29. The process according to claim 1, wherein the at least one carbonyl compound has a vapor pressure at 20° C. that is greater than 3 mbar and less than 700 mbar.

30. The process according to claim 1, wherein the at least one carbonyl compound has a vapor pressure at 20° C. that is greater than 4 mbar and less than 700 mbar.

31. The process according to claim 1, wherein, in the introducing step, a stream of carrier gas introduces the at least one carbonyl compound into the moulding box, wherein the carrier gas has at least one of the following features:
the carrier gas is air or nitrogen, with a dew point of less than 10° C.;
the carrier gas stream has a temperature greater than 35° C. and less than 120° C.; and
the carrier gas is introduced into the moulding box at a gauge pressure greater than 2 bar.

32. The process according to claim 1, wherein the moulding material mixture has at least one of the following features:
greater than 95 wt % is the refractory basic moulding material, based on the moulding material mixture, contained in the moulding material mixture;
between 1 wt % and 3.5 wt % water glass, including water, and relative to the basic moulding material contained in the moulding material mixture; and
between 0.15 wt % and 2.5 wt % water glass is contained in the moulding material mixture, based on the solid content of alkali silicates defined as $M_2O$ and $SiO_2$ of the employed water glass and relative to the moulding material mixture, wherein $M_2O$ is the sum of lithium-, sodium- and potassium-oxide.

33. The process according to claim 1, wherein the moulding material mixture has at least one of the following features:
greater than 0.1 to less than 1 wt % of the carbonyl compound, based on the moulding material mixture, is contained in the moulding material mixture or is admixed to it;
greater than 6.25 wt % and less than 125 wt % of the carbonyl compound is used, relative to the amount of alkali silicate added to the moulding material by the water glass binder and calculated as the sum of $Na_2O$, $K_2O$, $Li_2O$ and $SiO_2$, and
water glass binder, calculated as the molar quantity of the alkali metals M, and the carbonyl compound are added in a molar ratio of 6:1 to 3:1.

34. The process according to claim 1, wherein the water glass has a molar module $SiO_2/M_2O$ in the range of 2.0 to less than 3.5, wherein $M_2O$ is the sum of lithium-, sodium- and potassium oxide.

35. The process according to claim 1, further comprising the step of:
exposing the moulding material mixture to a gas stream with a temperature of 120 to 250° C., for less than 5 min, after exposing the moulding material to the at least one carbonyl compound.

36. A moulding material mixture for forming moulds or cores comprising:
a refractory basic moulding material;
water glass as binder;
particulate amorphous silicon dioxide; and
to cure the moulding material mixture, a gas comprising at least one carbonyl compound, the at least one carbonyl compound having the following features:
a molecular weight greater than 88 g/mol and less than 200 g/mol;
a boiling point at 1013 hPa between 20° C. and 200° C.; and
in addition to a carbonyl group (C=O), at least one further carbon atom, the at least one carbonyl compound having the formula $$R^1R^2C{=}O$$

wherein
$R^1$ is H or a C1 or C2 alkyl, and
$R^2$ is a carboxyl group R—C(=O)—O— bonded via the —O— moiety, where R is a C1 to C3 hydrocarbon.

37. The moulding material mixture according to claim 36, wherein the at least one carbonyl compound is selected from the group consisting of: alkyl carbonates, carboxylic acid esters, and carboxylic anhydrides.

* * * * *